United States Patent

Pagluica et al.

[11] Patent Number: 5,102,379
[45] Date of Patent: Apr. 7, 1992

[54] JOURNAL BEARING ARRANGEMENT

[75] Inventors: Gino Pagluica, Manchester; Cornelius V. Sundt, Windsor, both of Conn.

[73] Assignee: United Technologies Corporation, Hartford, Conn.

[21] Appl. No.: 674,267

[22] Filed: Mar. 25, 1991

[51] Int. Cl.$^5$ .................................. F16H 57/08
[52] U.S. Cl. ............................ 475/331; 475/159
[58] Field of Search ............ 475/159, 317, 331, 348

[56] References Cited

U.S. PATENT DOCUMENTS

| | | | |
|---|---|---|---|
| 1,678,798 | 7/1928 | Asprooth | 475/348 |
| 2,154,532 | 4/1939 | Ryder | 74/305 |
| 3,293,948 | 12/1966 | Jarchow et al. | 475/348 X |
| 3,315,546 | 4/1967 | Fritsch | 475/348 X |
| 3,964,334 | 6/1976 | Hicks | 74/410 |
| 4,719,918 | 1/1988 | McCreary | 475/331 X |
| 4,892,011 | 1/1990 | Nishida et al. | 475/159 X |

FOREIGN PATENT DOCUMENTS

| | | | |
|---|---|---|---|
| 58-196368 | 11/1983 | Japan | 475/159 |
| 62-288747 | 12/1987 | Japan | 475/348 |

Primary Examiner—Dwight Diehl
Attorney, Agent, or Firm—Edward L. Kochey, Jr.

[57] ABSTRACT

A planetary gear system includes a plurality of planet gears, each having a journal bearing and a pin, end supported in a planet carrier. Each pin has a small diameter central portion axially extending for end support. A larger diameter outer portion is integral with the central portion at an inboard merged zone, and has cantilever sections extending outboard from the merged zone. Each pin is sized such that bending of the merged zone in one direction is countered by bending of the cantilever sections in the other direction to achieve a substantially linear bearing surface under load.

10 Claims, 3 Drawing Sheets

JOURNAL BEARING ARRANGEMENT

DESCRIPTION

Technical Field

The invention relates to journals for highly loaded journal bearings, and in particular to a planet gear bearing arrangement for a planetary gear system.

Background of the Invention

Planetary gear systems have been used for aircraft either in the dual power mode or with the ring fixed and the planetary gear system used for speed reduction. In aircraft gas turbine engines the engine is rotating at high speed and used to directly drive the sun gear. High speed and high loads are imposed on this system where the system is used to drive the fan.

A planetary gear system has a planet gear carrier supporting the planet gears and transmitting the load from the plurality of planet gears. It is known that flexibility of the planet gear support is necessary to contribute to load equalization between the various planet gears.

Each planet gear includes an internal journal bearing surface and a pin around which this bearing rotates. The bearing surface is between the journal bearing and the pin. Deflection of the pin leads to distortion of the bearing surface and increasing the required clearance. A balance is required between a minimum clearance and excessive clearance in order for the bearing to function properly. Too small a clearance results in excessive film temperature, and too large a clearance will result in inadequate film thickness.

The load on the planet bearing which must be transferred through the pin to the carrier includes the sun gear force plus the ring gear force and the G-field centrifugal force. A larger pin would stiffen the bearing surface, but this would lead to higher weight and also higher G-forces. It would also stiffen the arrangement and deter any load sharing capability between the various planet gears. A smaller diameter pin would facilitate load sharing and reduce the G-forces, but it imposes bending upon the bearing surface.

It would be desirable to have an arrangement which is relatively light, facilitates load sharing, but maintains a minimum longitudinal deviation of the bearing surface.

SUMMARY OF THE INVENTION

A plurality of planet gears are supported from a planet carrier and located between a sun gear and a ring gear. Within each planet gear is a bearing secured to the gear portion and a pin around which the bearing rotates. This pin is then supported in the planet carrier.

Each pin has a cylindrical central axially extending portion which is supported in the carrier. A cylindrical outer portion is contiguous or integral with the central portion at an inboard merged zone, and this outer portion has cylindrical cantilever sections extending outboard from the merged zone in both directions. The cantilever sections are concentrically surrounding and spaced from the central portion outboard of the merged zone. The load applied through an oil film against the pin deflects the central portion with a bend radius toward the load and deflects the cantilever sections with the bend radius away from the load. The material and geometry of these portions are selected such that under the expected load distribution the deflected surface under load approaches an axial straight line.

DESCRIPTION OF THE PREFERRED EMBODIMENT

Figure 1:
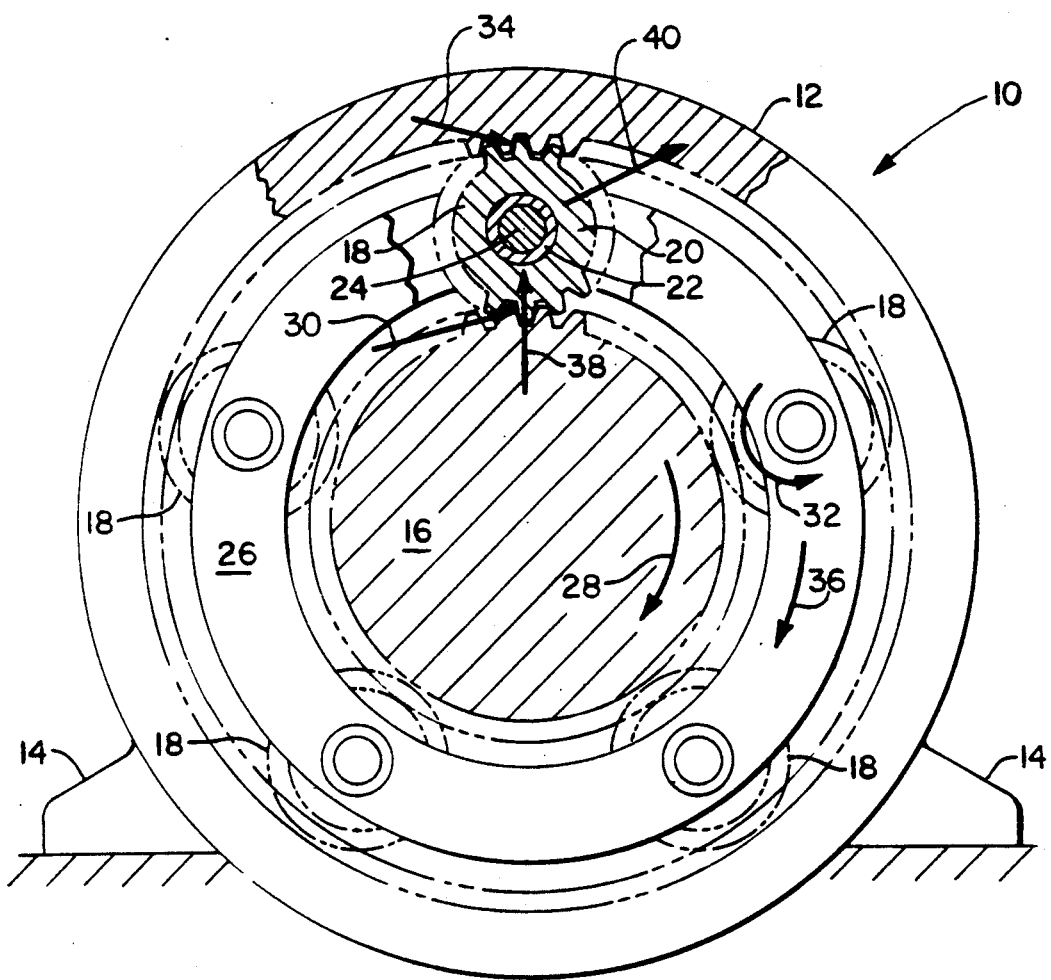
FIG. 1 is an axial sectional view through a planetary gear assembly.

A planetary gear assembly 10 includes a ring gear 12 which is rigidly supported on support 14. Sun gear 16 is centrally located within the ring gear. Five planet gears 18 are arranged to mesh with the sun gear and the ring gear.

Each planet gear has an outer gear section 20 with a bearing 22 fitted inside. The gear is supported on pin 24 which in turn is then supported by the planet gear carrier 26.

The sun gear 16 is rotated in the direction 28 applying force 30 against the planet gear. This causes the planet gear 18 to rotate in the direction of arrow 32 because of the force 34 imposed by the ring gear. The planet gears and the planet gear carrier 26 move in the direction 36.

Centrifugal force imposes a G-force 38 on the planet gear. The combination of these forces results in a resultant force 40 transferred from the planet gear bearing 22 to the pin 24, and thence to the carrier 26.

Figure 2:
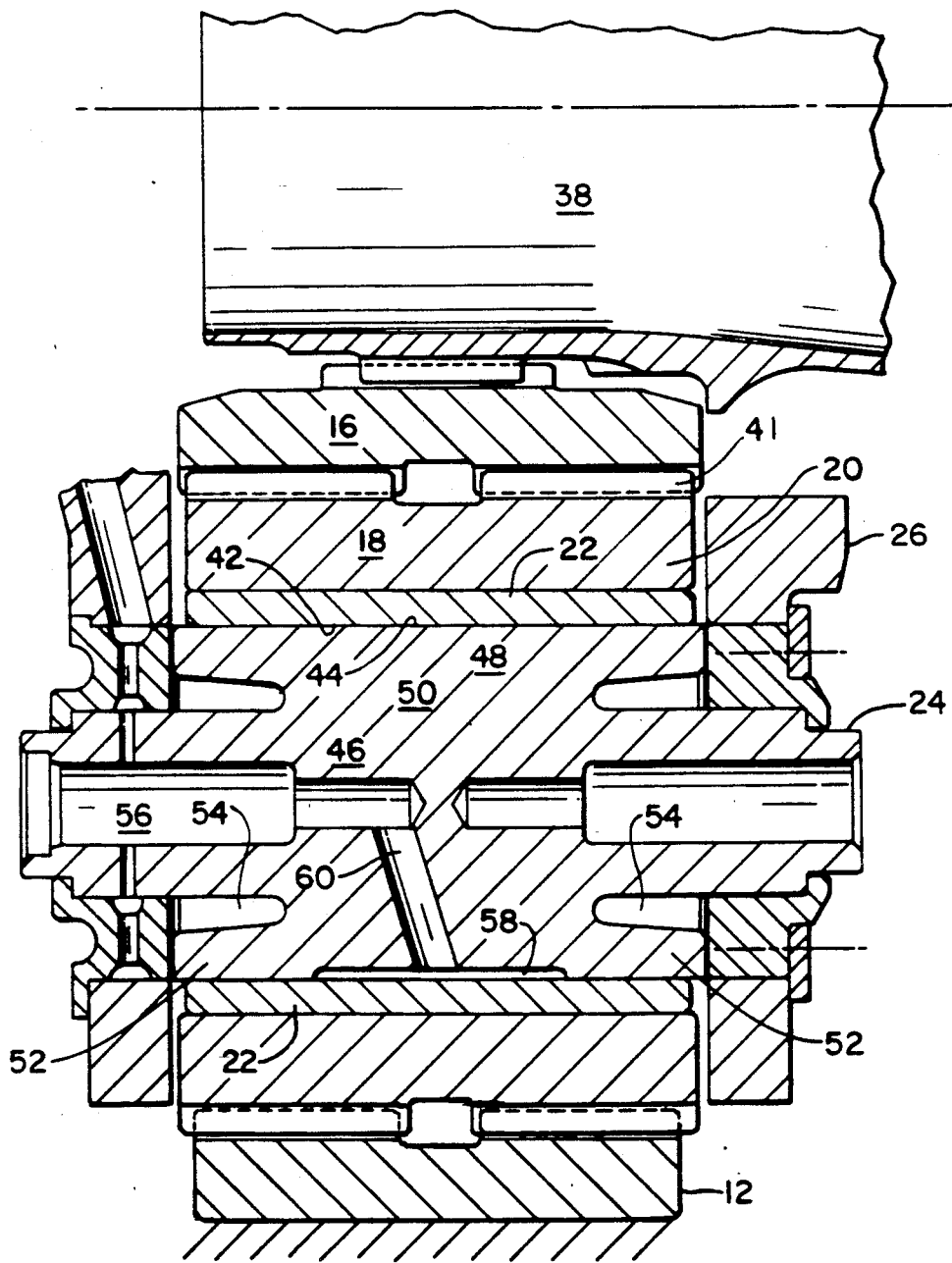
FIG. 2 is a longitudinal view through a planet gear.

As shown in FIG. 2, a central drive shaft 38 may be used to engage and rotate sun gear 16. Gear teeth 41 are located between the sun gear and the planet gear 18. Planet bearing 22 is fit tightly within the internal circumference of the planet gear.

An oil film is located between the bearing surface 42 of bearing 22 and the surface 44 of the pin 24. A cylindrical axially extending central portion 46 of the pin is end supported within carrier 26. A cylindrical outer portion 48 is integral with the central portion 46 at the inboard located merged zone 50. Cylindrical cantilever sections 52 extend outboard from the merged location in both directions. These cantilever sections concentrically surround the central portion 46 outboard of the merged location with grooves 54 providing space therebetween.

Also shown in this view is oil flow supply opening 56 supplying oil to oil distribution recess 58 through opening 60.

Figure 3:
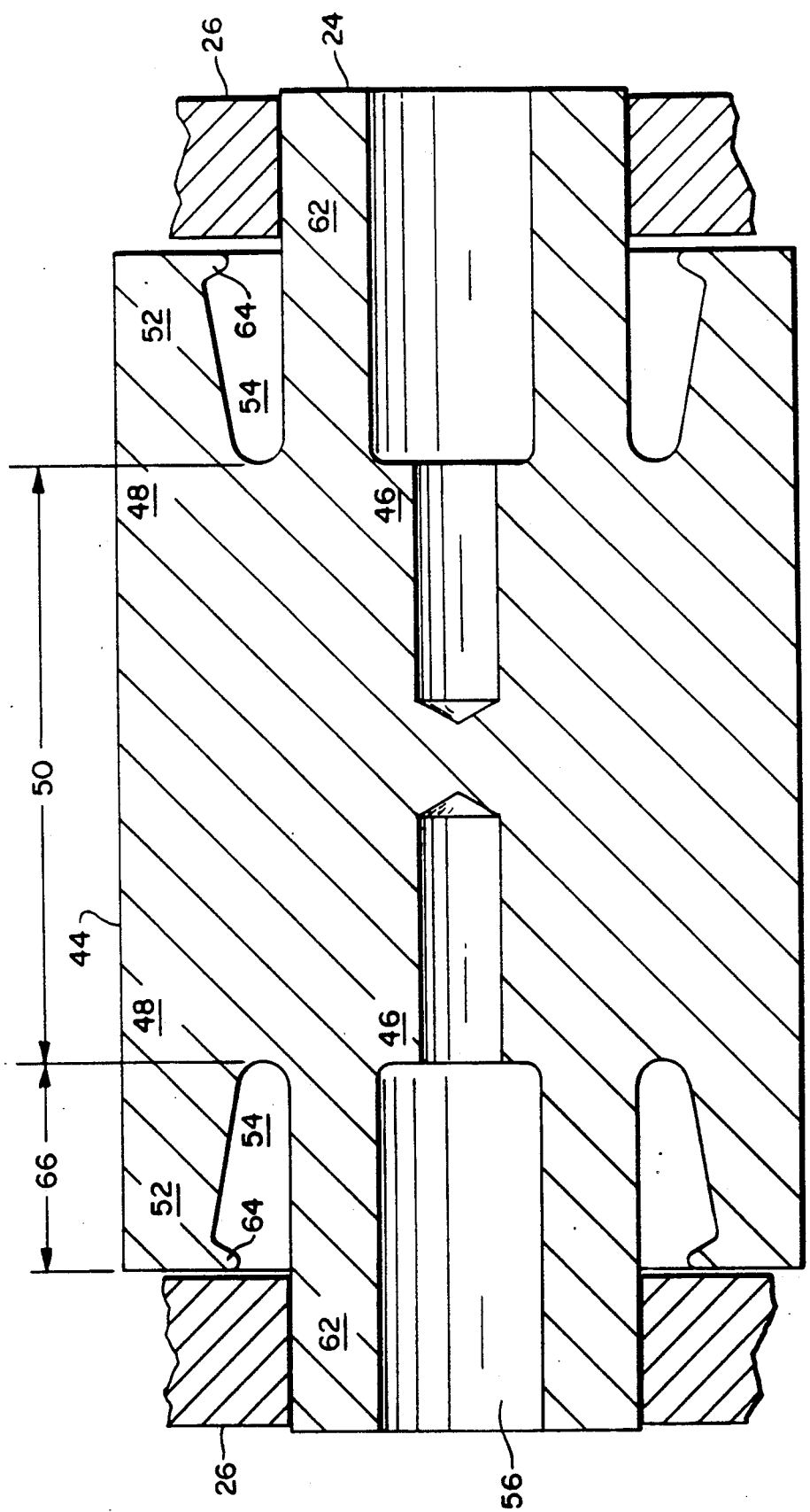
FIG. 3 is a longitudinal section through the pin.

The configuration of the pin is more specifically addressed with respect to the illustration of FIG. 3. Considering for discussion purposes the oil film load applied to the top, a conventional cylinder used as the pin would deflect downwardly. If the ends were freely supported, it would deflect the maximum amount being horizontal at the centerpoint. The outside edge of the pin in contact with the bearing would similarly reflect this pattern resulting in a substantial linear mismatch between the pin surface and the bearing.

If the ends were rigidly supported, there would be less ultimate deflection with the pin forming a sinuous type curve. While there is less deflection of the outer surface, it still results in a substantial nonlinear result. Furthermore, even if the end connections were rigid, a reasonably sized carrier structure would deflect whereby the result approaches that of the free end support.

The axially extending central portion 46 is supported at each end and may be designed for substantial deflection to accommodate load sharing deflection. In the merged zone 50 the outer portion 48 overlays and is integral with the central portion. This produces an increased stiffness in this central merged zone. Accordingly, the curvature of surface 44 in this zone will be slight compared to the overall deflection which is predominantly taken in the outboard portions 62 of the central portion.

The outer portion 48 has cantilever sections 52 which extend from the merged zone 50. The loading on these portions caused them to deflect downwardly in a direction opposite to the deflection of the central portion of the pin. The depth of the groove 54 and the overall geometry is selected such that the resultant curvature of surface 44 approaches a straight line.

The discussion above to some extent treated cantilever sections 52 as conventional cantilever beams. Since they are in fact cylindrical members it must be recognized that deflection of this portion can tend to cause ovalization of the structure resulting in less clearance at another point around the periphery. For the purpose of deterring this ovalization, reinforcing ribs 64 may be located at the outer edge of the cantilever portions.

In carrying out the inventive concept aimed at linearizing the axial trace of surface 44, there are many variables to be taken into account which make it difficult to specify the ideal geometry. The load imposed along the surface 44 is not uniform since the oil pressure stays relatively high throughout a major portion of the length, but drops off toward the ends. The modulus of elasticity of the particular material and the allowable stresses must be considered in establishing factors such as the thickness of cantilever portion 52 and the concomitant length thereof. Basically, the thickness in merged zone 50 tends to minimize local deflection there, while the reduced diameter of outboard portions 62 permit appropriate counter deflection. The outboard cantilever portions 52 of the outer section 48 are selected with a counter deformation to achieve a straight line. Ovalization potential must be studied for the particular loading condition.

Relatively high stress and strain levels may be tolerated by this pin. In contrast to the bearing which is rotating with respect to the load imposed upon it, this is not the case with the pin. Once the load is established by the drive forces and the G-force, it is always applied at the same location on the pin. This means that cycling forces are not imposed and fatigue is less of a problem than it would be were the flexibility to be placed in the bearing side.

This is also true regarding the loading and deflection of the carrier. More or less end support of the pin, either by deflection or by looseness of the joint, produces less variation in the linearity of the pin bearing surface, than a conventional pin.

It is also noted that hole 56 may be centrally located within the pin to lighten the pin since this portion of the material does not contribute significantly to the function of the pin. This hole may then be conveniently used as the oil supply line to supply the required oil to the oil distribution recess 58.

While the most desirable arrangement for any loading condition can only be determined by finite element analysis, a preliminary study indicates that the length of the cantilever portion 66 should be between 25 and 70 percent of the length of the merged portion 50.

We claim:
1. A pin for a heavily loaded journal bearing comprising:
 a substantially cylindrical central axially extending portion arranged for support only at each of its outboard ends;
 a cylindrical outer portion housing an outer surface and is contiguous or integral with said central portion at an inboard merged zone and having cylindrical cantilever sections extending outboard from said merged zone in both directions, said cantilever sections concentrically surrounding and spaced from said central portion outboard of said merged zone, whereby under an applied oil film load said central portion deflects with a bend radius toward the load and said cantilever sections deflect with the bend radius away from the load; and
 the geometry and material of said central portion and said outer portion selected such that the deflection of said outer surface under load approaches an axial straight line.

2. A pin as in claim 1, further comprising:
 a circumferential inwardly extending rib around the inner periphery of the outboard edge of each cantilever section.

3. A pin as in claim 1, further comprising:
 the length of each cantilever section being between 25 percent and 70 percent of the length of said merged zone.

4. A pin as in claim 1, further comprising:
 a central axial hole through a substantial portion of said central portion.

5. A pin as in claim 4, further comprising:
 an oil distribution recess located in the outer surface of said outer portion axially coextensive with a portion of said merged zone; and
 said central axial hole in fluid communication with said oil distribution recess.

6. A high speed heavy load planetary gear assembly comprising:
 a ring gear;
 a sun gear;
 a plurality of planet gears;
 a planet carrier;
 a journal bearing within each planet gear;
 a plurality of pins within said plurality of planet gears, each pin secured at each outboard end to said planet carrier;
 each of said pins comprising;
 a substantially cylindrical central axially extending portion arranged for support only at each of its outboard ends;
 a cylindrical outer portion having an outer surface and is contiguous or integral with said central portion at an inboard merged zone and having cylindrical cantilever sections extending outboard from said merged zone in both directions, said cantilever sections concentrically surrounding and spaced from said central portion outboard of said merged zone, whereby under an applied oil film load said central portion deflects with a bend radius toward the load and said cantilever sections deflect with the bend radius away from the load; and
 the geometry and material of said central portion and said outer portion selected such that the deflection of said outer surface under load approaches an axial straight line.

7. A gear assembly as in claim 6, further comprising:

a circumferential inwardly extending rib around the inner periphery of the outboard edge of each cantilever section.

8. A gear assembly as in claim 6, further comprising:
the length of each cantilever section being between 25 percent and 70 percent of the length of said merged zone.

9. A gear assembly as in claim 6, further comprising: a central axial hole through a substantial portion of said central portion.

10. A gear assembly as in claim 9, further comprising:
an oil distribution recess located in the outer surface of said outer portion axially coextensive with a portion of said merged zone; and
said central axial hole in fluid communication with said oil distribution recess.

* * * * *